US012718067B2

(12) United States Patent
Wang et al.

(10) Patent No.: US 12,718,067 B2
(45) Date of Patent: Aug. 25, 2026

(54) DATA PROCESSING METHOD AND APPARATUS, AND RELATED DEVICE

(71) Applicant: Huawei Technologies Co., Ltd., Shenzhen (CN)

(72) Inventors: Yongzhong Wang, Hangzhou (CN); Fuchun Wei, Hangzhou (CN); Wei Zhang, Shenzhen (CN); Xiaoxin Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 724 days.

(21) Appl. No.: 18/150,907

(22) Filed: Jan. 6, 2023

(65) Prior Publication Data

US 2023/0162008 A1 May 25, 2023

Related U.S. Application Data

(63) Continuation of application No. PCT/CN2021/099522, filed on Jun. 10, 2021.

(30) Foreign Application Priority Data

Jul. 7, 2020 (CN) ......................... 202010645234.7
Sep. 16, 2020 (CN) ......................... 202010975967.7

(51) Int. Cl.

*G06N 20/00* (2019.01)
*G06N 3/0464* (2023.01)
*G06N 3/091* (2023.01)
*G06V 10/77* (2022.01)
*G06V 10/82* (2022.01)

(52) U.S. Cl.

CPC ........... *G06N 3/0464* (2023.01); *G06N 3/091* (2023.01); *G06V 10/77* (2022.01); *G06V 10/82* (2022.01)

(58) Field of Classification Search

None

See application file for complete search history.

(56) References Cited

FOREIGN PATENT DOCUMENTS

CN 111222624 A 6/2020

OTHER PUBLICATIONS

Huang Yunlong et al, "EPAN: Effective parts attention network for scene text recognition," XP085965247, Neurocomputing, vol. 376, 2020, 12 pages.

*Primary Examiner* — David R Vincent

(74) *Attorney, Agent, or Firm* — Conley Rose, P.C.

(57) ABSTRACT

A data processing method includes obtaining first data and second data, where the first data and the second data are adjacent sequence data, and a sequence of the first data is prior to a sequence of the second data; padding third data between the first data and the second data according to a preset rule to obtain fourth data, where the third data isolates the first data from the second data; and completing data processing on the fourth data using a convolutional neural network.

20 Claims, 10 Drawing Sheets

Obtaining unit
101
Padding unit
102
Processing unit
103
Deletion unit
104

DATA PROCESSING METHOD AND APPARATUS, AND RELATED DEVICE

CROSS-REFERENCE TO RELATED APPLICATIONS

The present disclosure is a continuation of International Patent Application No. PCT/CN2021/099522, filed on Jun. 10, 2021, which claims priority to Chinese Patent Application 202010975967.7, filed on Sep. 16, 2020, which claims priority to Chinese Patent Application 202010645234.7, filed on Jul. 7, 2020, all of which are hereby incorporated by reference in their entirety.

TECHNICAL FIELD

The present disclosure relates to the field of computer technologies, and in particular, to a data processing method and apparatus, and a related device.

BACKGROUND

In the fields of image processing and natural language processing, a plurality of channels of data are usually processed simultaneously. When the plurality of channels of data are processed using a convolutional neural network (CNN) to improve data processing efficiency of an intelligent processing apparatus, the plurality of channels of data are usually input to the convolutional neural network as one batch, so that processing of the plurality of channels of data is completed through one forward inference. However, when processing the plurality of channels of data, a neural network model needs to perform operations such as vectorization and fractal on each channel of data separately. This increases time of data tiling and memory reading, and reduces data processing efficiency. In addition, if a data amount of each channel of data is small, compared with processing one channel of data with a large data amount through one forward inference, processing the plurality of channels of data with small data amounts through one forward inference cannot fully utilize a bandwidth and a computing capability of the intelligent processing apparatus. Therefore, how to fully utilize the bandwidth and the computing capability of the intelligent processing apparatus to improve data processing efficiency is an urgent problem to be resolved.

SUMMARY

The present disclosure discloses a data processing method and apparatus, and a related device, to improve data processing efficiency of an apparatus, and fully utilize a bandwidth and a computing capability of the apparatus.

According to a first aspect, the present disclosure provides a data processing method, where the method includes:

An intelligent processing apparatus obtains first data and second data, pads, according to a preset rule, third data used to isolate the first data from the second data between the first data and the second data, to obtain fourth data, and then completes processing on the fourth data using a convolutional neural network.

The first data and the second data are data to be spliced together, and a sequence of the first data is prior to a sequence of the second data during splicing. The first data is any one of image data, voice data, or a text sequence, and the second data is any one of image data, voice data, or a text sequence.

Splicing two groups of data into one piece of data with a large data amount and more elements, and inputting the data obtained after splicing into a convolutional neural network model for processing can avoid separately performing operations such as vectorization and fractal on each group of data in a process of simultaneously processing a plurality of groups of data using the convolutional neural network. This improves efficiency of data processing performed by the intelligent processing apparatus using the convolutional neural network, and fully utilizes a bandwidth of the intelligent processing apparatus. By padding elements used to isolate two groups of data between the two groups of data, a result obtained after spliced data passes through a convolutional layer of the convolutional neural network includes a result obtained when each group of data is separately processed. This avoids the following problem: after two groups of data are directly spliced for convolutional processing, receptive fields corresponding to some elements in an output result include elements in two feature maps, and consequently final detection and recognition results of the convolutional neural network are inaccurate.

In a specific implementation, the padding, according to a preset rule, third data between the first data and the second data, to obtain fourth data specifically includes: when row quantities of the first data and the second data are the same, or both row quantities and column quantities of the first data and the second data are the same, padding third data of h1 rows and c1 columns between the last column on a right side of the first data and the first column on a left side of the second data, to obtain the fourth data, where the first data includes h1 rows and w1 columns, the second data includes h2 rows and w2 columns, the fourth data includes h1+2p1 rows and w1+c1+w2+2p1 columns, values of h1 and h2 are the same, p1 is a padding size corresponding to a first network layer, and the first network layer is a network layer to which the fourth data is to be input.

In a specific implementation, the padding, according to a preset rule, third data between the first data and the second data, to obtain fourth data specifically includes: when column quantities of the first data and the second data are the same, or both row quantities and column quantities of the first data and the second data are the same, padding third data of r1 rows and w1 columns between the last row on a lower side of the first data and the first row on an upper side of the second data, to obtain the fourth data, where the first data includes h1 rows and w1 columns, the second data includes h2 rows and w2 columns, values of w1 and w2 are the same, p1 is a padding size corresponding to a first network layer, the first network layer is a network layer to which the fourth data is to be input, and the fourth data includes h1+r1+h2+2p1 rows and w1+2p1 columns, that is, data of p1 rows is padded on each of an upper side and a lower side of the fourth data, and data of p1 columns is padded on each of a left side and a right side of the fourth data.

Based on the row quantities and the column quantities of the first data and the second data, the third data is padded between the last column on the right side of the first data and the first column on the left side of the second data, or the third data is padded between the last row on the lower side of the first data and the first row on the upper side of the second data, to connect the first data and the second data, where values of elements padded in the fourth data are zeroes. using the method, two or more groups of data can be spliced into one group of data with a larger data amount, and the spliced data is input to the convolutional neural network. This avoids the following problem: after two groups of data are directly spliced for convolutional processing, receptive fields corresponding to some elements in an output result include elements in two feature maps, and consequently final detection and recognition results of the convolutional neural network are inaccurate.

In a specific implementation, the determining the column quantity c1 of the third data based on the column quantity w1 of the first data and network parameters of the first network layer includes: the intelligent processing apparatus determines, based on the column quantity w1 of the first data, a size k1, the padding size p1, and a stride size s1, a column quantity wo1 of fifth data output after the first data is input to the first network layer; determines, based on the column quantity w1, the padding size p1, the stride size s1, and the column quantity wo1, a distance Δw between a center of the last operation on the first data and a center of the first operation on the second data in a horizontal direction when a convolutional kernel or a pooling kernel processes spliced data after the spliced data is obtained by padding data of h1 rows and p1 columns between the last column of the first data and the first column of the second data; and then determines the column quantity c1 based on the padding size p1, the stride size s1, and the distance Δw.

In the present disclosure, the column quantity wo1, the distance Δw, and the column quantity c1 may be calculated using the following formulas:

$$w_{o1} = \text{ceil}\left(\frac{w_1 + 2p_1 - k_1 - (k_1 - 1)(d_1 - 1) + 1}{s_1}\right)$$

$$\Delta w = w_1 + p_1 - w_{o1} * s_1$$

$$c_1 = p_1 + \text{ceil}\left(\frac{\Delta w}{s_1}\right) * s_1 - \Delta w$$

In a specific implementation, that an intelligent processing apparatus completes data processing on the fourth data using a convolutional neural network includes: inputting the fourth data to the first network layer of the convolutional neural network for processing to obtain sixth data, where the sixth data includes seventh data, eighth data, and interference data, the seventh data is obtained after the first network layer processes the first data, the eighth data is obtained after the first network layer processes the second data, and the interference data is data between the last column of the seventh data and the first column of the eighth data; determining a column quantity $c_2$ of the interference data, and deleting the interference data of the $c_2$ columns; determining a column quantity $c_3$ of ninth data padded between the last column of the seventh data and the first column of the eighth data; padding the ninth data of $c_3$ columns between the last column of the seventh data and the first column of the eighth data, to obtain tenth data; and completing data processing on the tenth data using the convolutional neural network.

It should be understood that, because the convolutional neural network includes a plurality of convolutional layers and a plurality of pooling layers, after the fourth data obtained by splicing is input to the first network layer for convolutional processing to obtain the sixth data, the sixth data is further input to a next network layer (a convolutional layer or a pooling layer) of the convolutional neural network for convolutional processing or pooling processing. The sixth data includes one or more columns of interference elements used to isolate the seventh data from the eighth data, and values of the interference elements are not all 0s. Therefore, before the sixth data is input to the next network layer of the convolutional neural network, the column quantity $c_2$ of the interference elements needs to be determined. The interference elements of the $c_2$ columns need to be deleted from the sixth data. Then, the column quantity $c_3$ of the ninth data padded between the last column of the seventh data and the first column of the eighth data is determined based on convolutional parameters or pooling parameters of the next network layer. The ninth data is padded between the last column of the seventh data and the first column of the eighth data, to obtain the tenth data, and finally the tenth data is input to the next network layer.

In a specific implementation, the determining a column quantity $c_2$ of the interference data by the intelligent processing apparatus includes: determining a column quantity $w_{o2}$ of the sixth data based on a column quantity $w_1+c_1+w_2+2p_1$ of the fourth data and the network parameters of the first network layer, and determining the column quantity $c_2$ of the interference data based on the column quantity $w_{o2}$ of the sixth data, a column quantity of the seventh data, and a column quantity of the eighth data. In the present disclosure, the column quantity $w_{o1}$, the distance Δw, and the column quantity $c_1$ may be calculated using the following formulas:

$$w_{o2} = \text{ceil}\left(\frac{w_1 + w_2 + 2p_1 + c_1 - k_1 - (k_1 - 1)(d_1 - 1) + 1}{s_1}\right)$$

$$c_2 = w_{o2} - w_{o1} - w_{o3}$$

In a specific implementation, the padding third data of r1 rows and w1 columns between the last row of the first data and the first row of the second data by the intelligent processing apparatus, to obtain the fourth data includes: determining the row quantity r1 of the third data based on the row quantity h1 of the first data and network parameters of the first network layer, where the network parameters of the first network layer include a size k1 of a convolutional kernel or a pooling kernel, a padding size p1, and a stride size s1; obtaining the column quantity w1 of the first data; and padding the third data of r1 rows and w1 columns between the first data and the second data, to obtain the fourth data.

In a specific implementation, the determining the row quantity r1 of the third data based on the row quantity h1 of the first data and network parameters of the first network layer includes: determining, based on the row quantity h1 of the first data, the size k1 of the convolutional kernel or the pooling kernel, the padding size p1, and the stride size s1 of the kernel, a row quantity ho1 of fifth data output after the first data is input to the first network layer; based on the row quantity w1, the padding size p1, the stride size s1, and the row quantity ho1, determining a distance Δh between a center of the last operation on the first data and a center of the first operation on the second data in a vertical direction when the convolutional kernel or the pooling kernel processes spliced data after the spliced data is obtained by padding data of h1 rows and p1 columns between the last row of the first data and the first row of the second data; and determining the row quantity r1 based on the padding size p1, the stride size s1, and the distance Δh.

In a specific implementation, that an intelligent processing apparatus completes data processing on the fourth data using a convolutional neural network includes: inputting the fourth data to the first network layer for processing to obtain sixth data, where the sixth data includes seventh data, eighth data, and interference data, the seventh data is obtained after the first network layer processes the first data, the eighth data is obtained after the first network layer processes the second data, and the interference data is data between the last row of the seventh data and the first row of the eighth data; determining a row quantity r2 of the interference data, and deleting the interference data of r2 rows; determining a row quantity r3 of ninth data padded between the last row of the seventh data and the first row of the eighth data; padding the ninth data of r3 rows between the last row of the seventh data and the first row of the eighth data, to obtain tenth data; and completing data processing on the tenth data using the convolutional neural network.

In a specific implementation, the determining a row quantity r2 of the interference data by the intelligent processing apparatus includes: determining a row quantity ho2 of the sixth data based on the row quantity h1+r1+h2+2p1 of the fourth data and the network parameters of the first network layer, and determining the row quantity r2 of the interference data based on the row quantity ho2 of the sixth data, a row quantity of the seventh data, and a row quantity of the eighth data.

According to a second aspect, an embodiment of the present disclosure provides a data processing apparatus, including units configured to perform the data processing method in the first aspect or any one of the possible implementations of the first aspect.

According to a third aspect, an embodiment of the present disclosure provides a computing device, including a processor and a memory. The memory is configured to store instructions, the processor is configured to execute the instructions, and when executing the instructions, the processor performs the method in the first aspect or any one of the specific implementations of the first aspect.

According to a fourth aspect, an embodiment of the present disclosure provides a computer-readable storage medium. The computer-readable storage medium stores instructions, and when the instructions are run on a computing device, the method according to the first aspect or any one of the specific implementations of the first aspect is performed.

Based on the implementations provided in the foregoing aspects, further combination may be performed in the present disclosure to provide more implementations.

DESCRIPTION OF EMBODIMENTS

A data processing apparatus and method provided in the present disclosure are described in detail below with reference to the accompanying drawings.

Figure 1:
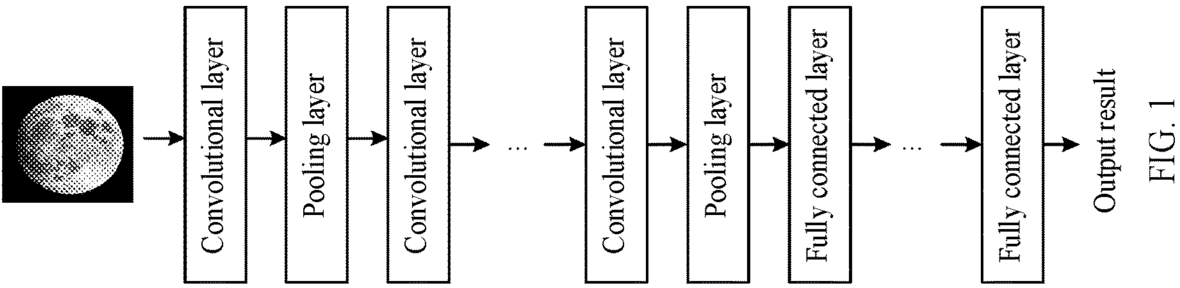
FIG. 1 is a schematic diagram of a structure of a convolutional neural network.

A CNN is a deep learning model, which is usually used to analyze data such as images. As shown in FIG. 1, the CNN usually includes network layers such as a convolutional layer, a pooling layer, and a fully connected layer. The convolutional layer is configured to perform feature aggregation on input data to obtain a feature map. The pooling layer is configured to perform, after the convolutional layer performs feature extraction, feature selection on the feature map output by the convolutional layer. The fully connected layer is configured to perform nonlinear combination of features obtained by the convolutional layer and the pooling layer to obtain an output result. Each network layer includes network layer parameters such as a kernel size, a padding size, and a stride size. For example, convolutional parameters corresponding to the convolutional layer include a convolutional kernel size, a padding size of the convolutional layer for input to a feature map, and a stride size of a convolutional kernel, and pooling parameters corresponding to the pooling layer include a pooling kernel size, a padding size of the pooling layer for input to a feature map, and a stride size of a pooling kernel. Usually, the CNN inputs feature data obtained after passing through one or more convolutional layers to the pooling layer for feature aggregation, and finally inputs the feature data to the fully connected layer after a plurality of times of convolutional and pooling processing is performed. In FIG. 1, an example in which one convolutional layer is connected to one pooling layer is used.

In the fields of image processing and natural language processing, a plurality of channels of data are usually processed simultaneously. In an example of image processing, in a video surveillance system shown in FIG. 2 or a data center shown in FIG. 3, an intelligent processing apparatus needs to process a plurality of images simultaneously, for example, a plurality of images uploaded by a plurality of surveillance cameras or a plurality of pieces of user equipment, a plurality of images uploaded by a same camera or a same piece of user equipment, or a plurality of images obtained by separately segmenting a plurality of objects in a same image when the plurality of objects are processed. It should be understood that the intelligent processing apparatus may be a card, or may be a server or another computing device. In the intelligent processing apparatus, the image processing may be performed by any one or more of components with data processing capabilities, such as a central processing unit (CPU), a graphics processing unit (GPU), a tensor processing unit (TPU), or a neural network processing unit (NPU). The user equipment may be any one or more of a mobile phone, a tablet computer, a personal computer, a camera, a scanner, a surveillance camera, or a vehicle-mounted camera.

An embodiment of the present disclosure provides a data processing method. Two or more images are adaptively spliced to obtain a large image, and then the spliced image is input to a convolutional neural network for forward inference, to fully utilize a bandwidth and a computing capability of an intelligent processing apparatus, and improve data processing efficiency of the intelligent processing apparatus.

It should be noted that in a process of processing an image by the convolutional neural network, output results of a convolutional layer and a pooling layer are both referred to as feature maps. The image is input to the convolutional neural network in a form of pixel matrix. For example, if the image is a gray image, a two-dimensional pixel matrix is input, or if the image is a color image, a three-dimensional pixel matrix (or referred to as a tensor) is input. After a pixel matrix corresponding to one image is input to a first convolutional layer of the convolutional neural network, a feature map corresponding to the image is obtained through convolutional processing. Therefore, a pixel matrix corresponding to an image and a feature map corresponding to the image are both in matrix forms. In this embodiment of the present disclosure, for ease of description, a pixel matrix input by the first convolutional layer of the convolutional neural network is also referred to as a feature map, and each value in the feature map is referred to as an element.

Figure 4:
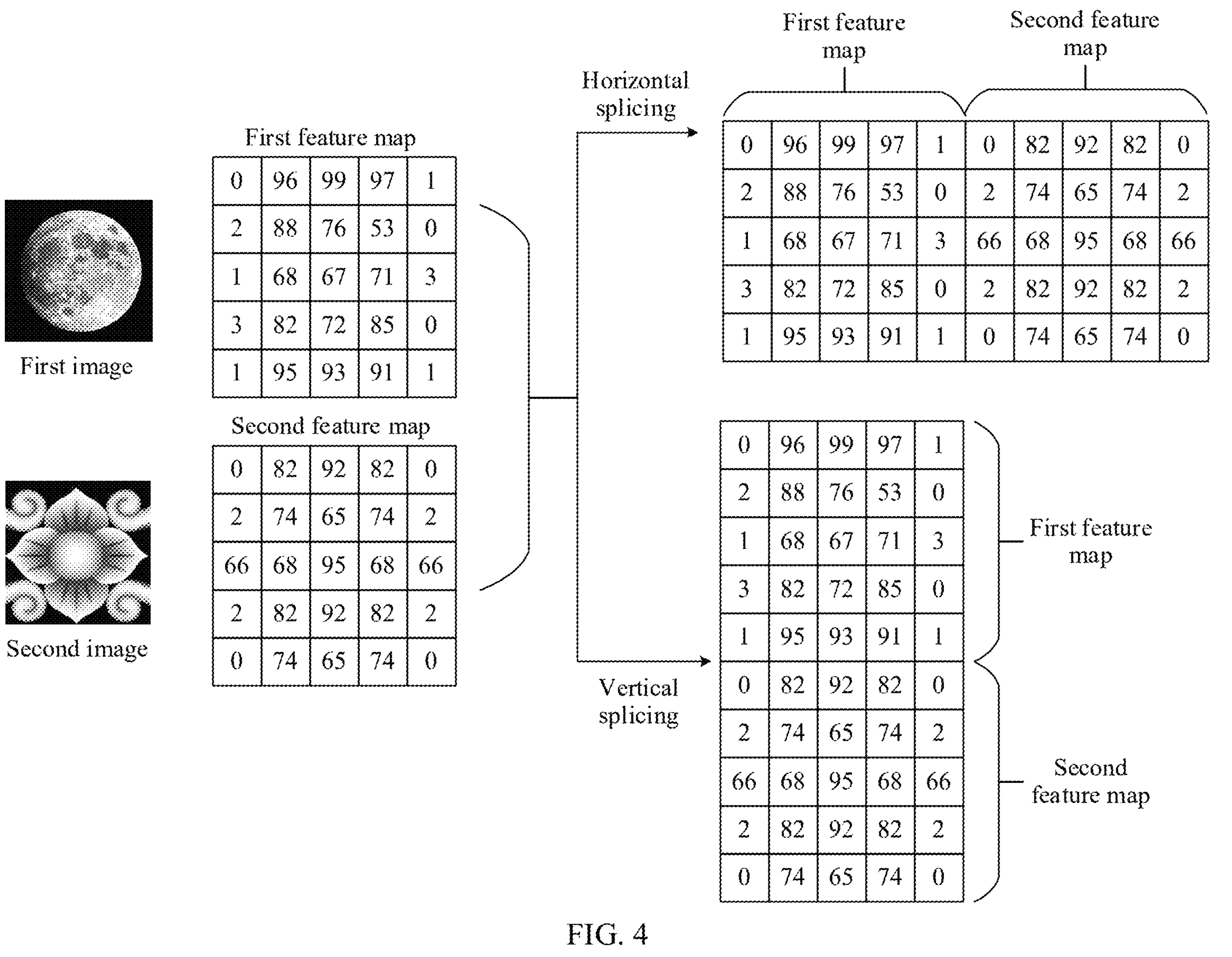
FIG. 4 is a schematic diagram of feature map splicing according to an embodiment of the present disclosure.

When feature maps corresponding to images are spliced, horizontal splicing or vertical splicing may be performed. FIG. 4 is a schematic diagram of feature map splicing. A first feature map is a feature map corresponding to a first image, and a second feature map is a feature map corresponding to a second image, where each row and each column of the first feature map and the second feature map separately have five elements. The horizontal splicing means that the last column on a right side of a feature map is connected to the first column on a left side of another feature map, and the vertical splicing means that the last row on a lower side of a feature map is connected to the first row on an upper side of another feature map. In the horizontal splicing, row quantities of the feature maps are the same, and column quantities of the feature maps may be the same or different. In the vertical splicing, column quantities of the feature maps are the same, and row quantities of the feature maps may be the same or different.

Figure 5:
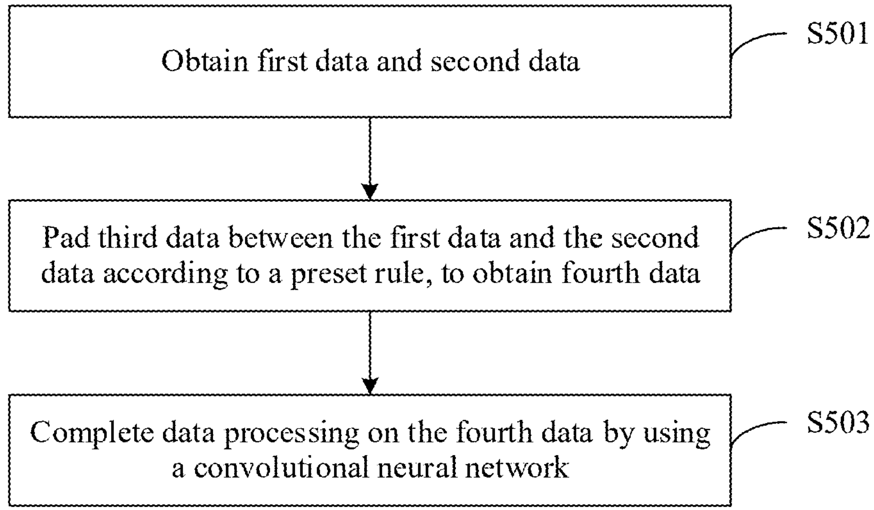
FIG. 5 is a schematic flowchart of a data processing method according to an embodiment of the present disclosure.

In this embodiment of the present disclosure, an example in which input data is images, and two images are horizontally spliced and input to a convolutional layer is used to describe the data processing method in this embodiment of the present disclosure. FIG. 5 is a schematic flowchart of a data processing method according to an embodiment of the present disclosure. The data processing method includes S501 to S503.

S501: Obtain first data and second data.

The first data is a first feature map corresponding to a first image, and the second data is a second feature map corresponding to a second image. The first data and the second data are two pieces of data of adjacent sequences to be spliced. The first data includes elements of $h_1$ rows and $w_1$ columns. The second data includes elements of $h_2$ rows and $w_2$ columns. When the first data and the second data are horizontally spliced, values of $h_1$ and $h_2$ are the same.

S502: Pad third data between the first data and the second data according to a preset rule to obtain fourth data.

The third data isolates the first data from the second data, and the fourth data includes the first data, the second data, and the third data. A method for padding the third data between the first feature map and the second feature map to obtain a third feature map is described in detail using an example in which the first feature map and the second feature map are horizontally spliced, and elements of the first feature map are located on a left side of elements of the second feature map after splicing.

After obtaining the first feature map and the second feature map, an intelligent processing apparatus determines, based on a column quantity $w_1$ of the first feature map and convolutional parameters of a first convolutional layer to which the first feature map and the second feature map are to be input, a column quantity of the third data to be padded between the first feature map and the second feature map. Convolutional parameters include a convolutional kernel size corresponding to a convolutional layer, a padding size corresponding to the convolutional layer, a stride size of a convolutional kernel, and a dilation rate. When the convolutional kernel is 3*3, the convolutional kernel size is equal to 3.

With reference to (formula 1), the intelligent processing apparatus can determine, based on the convolutional parameters of the first convolutional layer to which the first feature map and the second feature map are to be input and the column quantity $w_1$ of the first feature map, a column quantity $w_{o1}$ of fifth data output after the first feature map is separately input to the first convolutional layer for a convolutional operation:

$$w_{o1} = \text{ceil}\left(\frac{w_1 + 2p_1 - k_1 - (k_1 - 1)(d_1 - 1) + 1}{s_1}\right) \quad \text{(Formula 1)}$$

In formula 1, the ceil operation indicates that a minimum integer greater than or equal to a specified expression is returned, $p_1$ is a padding size corresponding to the first convolutional layer, $k_1$ is a convolutional kernel size corresponding to the first convolutional layer, $s_1$ is a stride size of a convolutional kernel corresponding to the first convolutional layer, and $d_1$ is a dilation rate. For example, the column quantity $w_1$ of the first feature map is 4, the padding size $p_1$ in the convolutional parameters is 2, the convolutional kernel size $k_1$ is 5, the stride size $s_1$ is 1, and the dilation rate $d_1$ is 1. Therefore, the column quantity $w_{o1}$ of an output feature map is 4.

After obtaining, according to the foregoing (formula 1), the column quantity $w_{o1}$ of the output feature map after the first feature map is separately input to the first convolutional layer for the convolutional operation, the intelligent processing apparatus may determine, based on the column quantity $w_1$ of the first feature map, the padding size $p_1$ of the first convolutional layer, the column quantity $w_{o1}$ of the output feature map, and the stride size $s_1$ of the convolutional kernel, a distance Δw between a center of the last operation on the first feature map by the convolutional kernel and a center of the first operation on the second feature map by the convolutional kernel in the first horizontal movement of the convolutional kernel in a process in which elements of $p_1$ columns are padded between the first feature map and the second feature map to obtain a spliced feature map, the spliced feature map is input to the first convolutional layer, and then the convolutional kernel performs a convolutional operation on the spliced feature map. The spliced feature map indicates a feature map obtained after the elements of $p_1$ columns are padded between the first feature map and the second feature map to splice the first feature map and the second feature map, elements of $p_1$ columns are padded on each of a left side and a right side of the spliced feature map, and elements of $p_1$ rows are padded on each of an upper side and a lower side of the spliced feature map. The intelligent processing apparatus calculates the distance Δw using the following (formula 2):

$$\Delta w = w_1 + p_1 - w_{o1} * s_1 \quad \text{(Formula 2)}$$

After the distance Δw is obtained, to ensure that the distance between the center of the last operation on the first feature map by the convolutional kernel and the center of the first operation on the second feature map by the convolutional kernel in the first horizontal movement of the convolutional kernel is an integer multiple of the stride size s1 of the convolutional kernel, the intelligent processing apparatus calculates, according to (formula 3) based on the distance Δw, the padding size p1, and the stride size s1, the column quantity c1 of the third data to be finally padded between the first feature map and the second feature map:

$$c_1 = p_1 + \mathrm{ceil}\left(\frac{\Delta w}{s_1}\right) * s_1 - \Delta w \quad \text{(Formula 3)}$$

After the column quantity c1 of the third data is obtained through calculation, when the first feature map and the second feature map are spliced, elements of h1 rows and c1 columns (that is, the third data) are padded between the last column of the first feature map and the first column of the second feature map, the elements of p1 columns are padded on each of the left side and the right side of the spliced feature map, and the elements of p1 rows are padded on each of the upper side and the lower side of the spliced feature map, to obtain the third feature map (that is, the fourth data). In other words, after the third data is padded between the first feature map and the second feature map to obtain the spliced feature map, values of the row quantity and the column quantity of the elements that are padded on the upper side, the lower side, the left side, and the right side of the spliced feature map are the padding size p1 of the first convolutional layer. The third feature map includes elements of h1+2p1 rows and w1+c1+w2+2p1 columns, where values of the padded elements are 0s.

Figure 6:
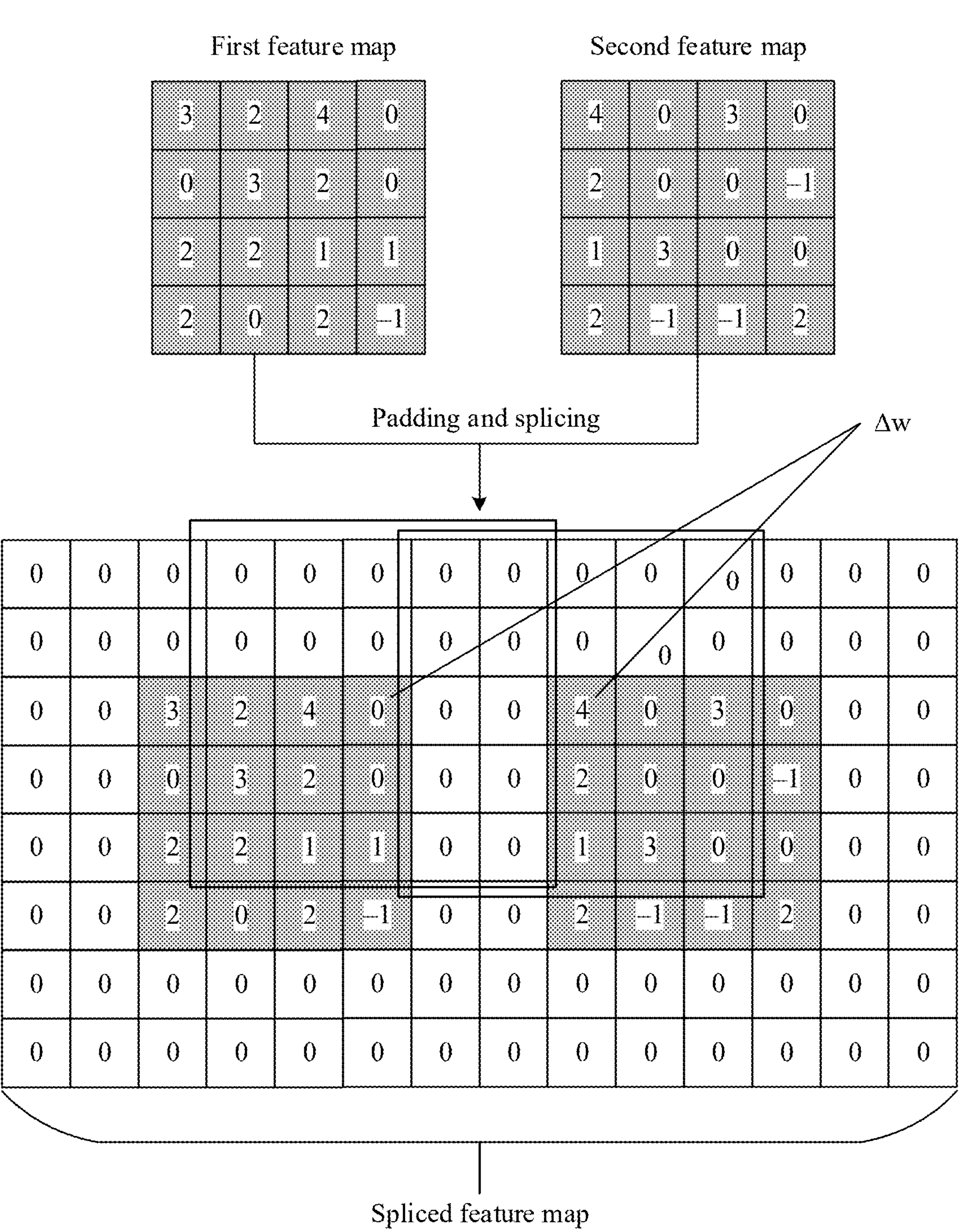
FIG. 6 is a schematic diagram of another manner of feature map splicing according to an embodiment of the present disclosure.

For example, as shown in FIG. 6, both the first feature map and the second feature map are 4*4 feature maps, and the convolutional kernel size k1 is 5, the padding size p1 is 2, the stride size s1 is 1, and the dilation rate $d_1$ is 1. Therefore, the elements of p1 columns are padded between the first feature map and the second feature map, elements of two columns are padded on each of the left side and the right side of the spliced feature map, and elements of two rows are padded on each of the upper side and the lower side of the spliced feature map. The obtained spliced feature map is shown in FIG. 6. According to the foregoing (formula 1) and (formula 2), it can be learned by calculation that Δw is 2. As shown in FIG. 6, in the first horizontal movement of the convolutional kernel, the center of the last operation on the first feature map is an element 0, the center of the first operation on the second feature map by the convolutional kernel is an element 4, and a distance between the two elements is two columns of elements, that is, Δw is equal to 2. According to the foregoing (formula 1) to (formula 3), it can be learned by calculation that a value of c1 is equal to 2. Because the value of c1 is the same as the value of the padding size p1, the third feature map obtained after the elements of c1 columns are padded between the first feature map and the second feature map is the same as the spliced feature map in FIG. 6.

S503: Complete data processing on the fourth data using a convolutional neural network.

Figure 7:
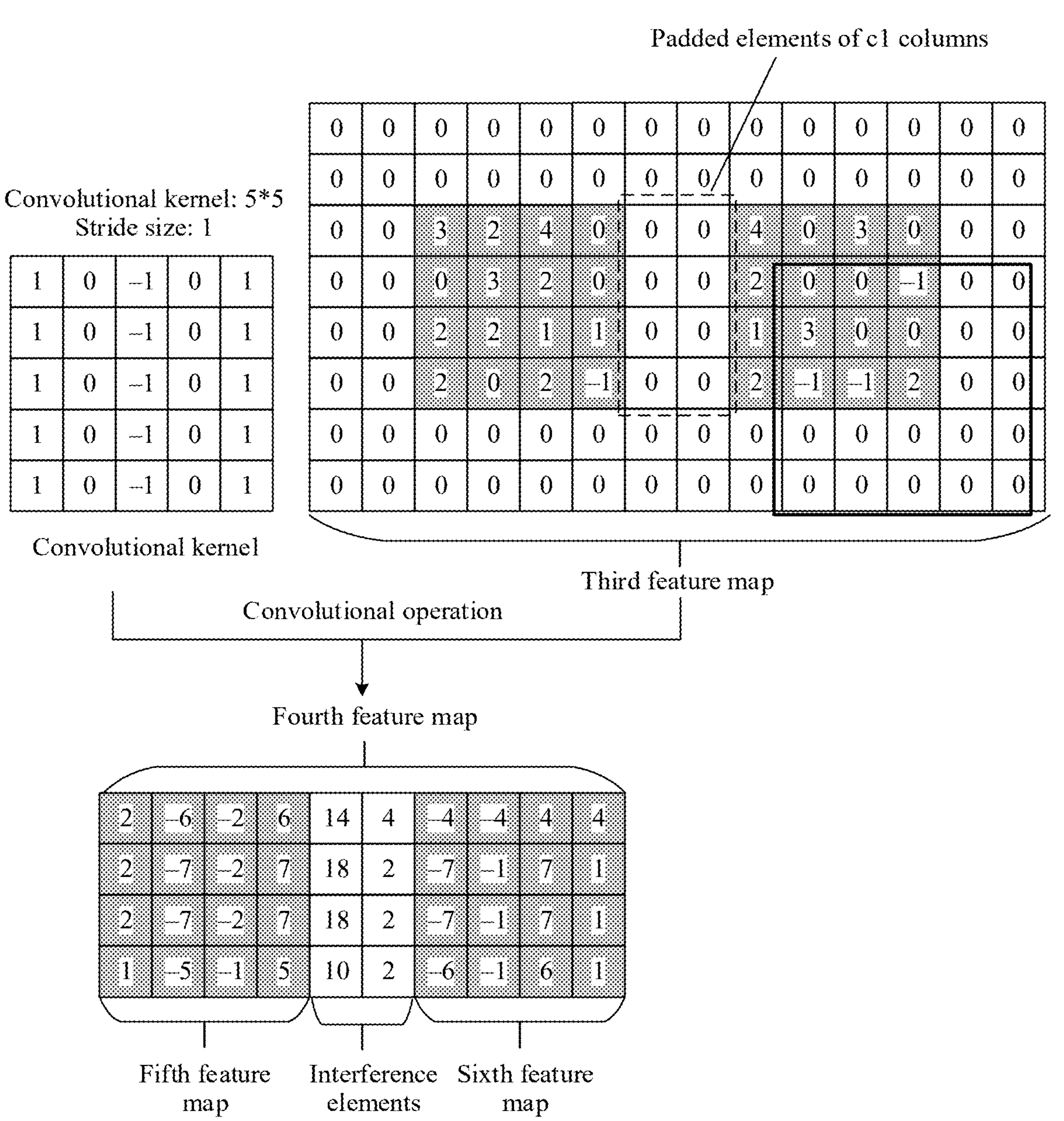
FIG. 7 is a schematic diagram of an operation on a spliced feature map according to an embodiment of the present disclosure.

After the elements of c1 columns are padded between the first feature map and the second feature map, and the first feature map and the second feature map are spliced to obtain the third feature map, the third feature map is input to the first convolutional layer for convolutional processing to obtain sixth data (that is, a fourth feature map). The fourth feature map includes seventh data (that is, a fifth feature map), eighth data (that is, a sixth feature map), and interference data. The fifth feature map is a feature map obtained after the first feature map is separately input to the first convolutional layer for convolutional processing. The sixth feature map is a feature map obtained after the second feature map is separately input to the first convolutional layer for convolutional processing. That is, the fifth feature map is a feature extracted from the first feature map, and the sixth feature map is a feature extracted from the second feature map. The interference data is elements between the last column of the fifth feature map and the first column of the sixth feature map. FIG. 7 is a schematic diagram of performing convolutional processing on a spliced feature map according to an embodiment of the present disclosure. The third feature map includes elements of eight rows and fourteen columns, and after a convolutional operation is performed using a convolutional kernel whose size is 5*5 and whose stride size is 1, a fourth feature map including elements of four rows and 10 columns is output. The fifth feature map includes elements of four rows and four columns, the sixth feature map includes elements of four rows and four columns, and interference elements of four rows and two columns other than the fifth feature map and the sixth feature map are features that do not belong to the first image or the second image.

Splicing feature maps corresponding to two images into one feature map including more elements, and inputting the one feature map obtained after splicing to a convolutional neural network model for processing can avoid separately performing operations such as vectorization and fractal on each image in a process of simultaneously processing a plurality of images by the convolutional neural network. This improves efficiency of data processing performed by the intelligent processing apparatus using the convolutional neural network, and fully utilizes a bandwidth of the intelligent processing apparatus.

Figure 8:
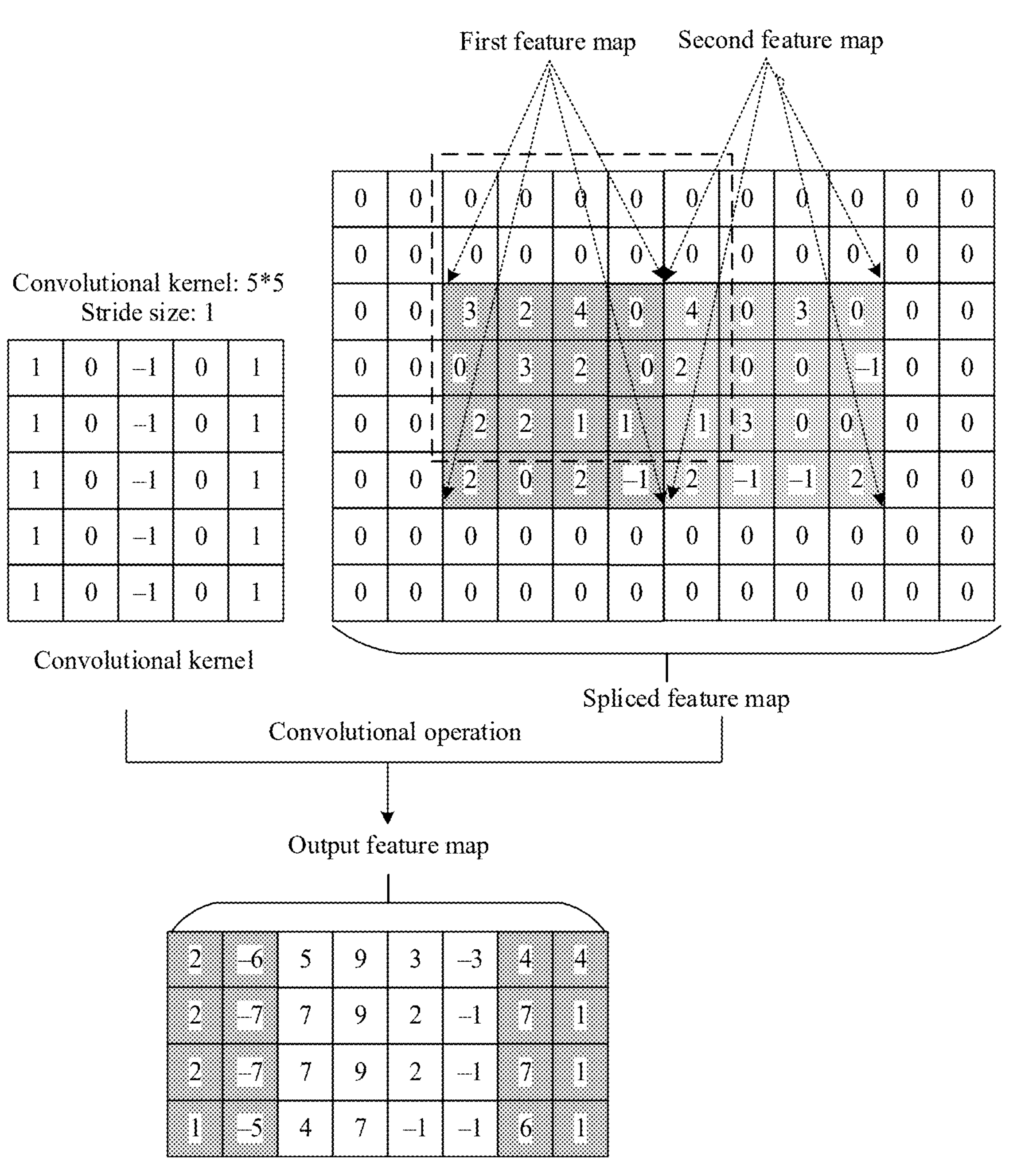
FIG. 8 is a schematic diagram of another operation on a spliced feature map according to an embodiment of the present disclosure.

In addition, if no element used for isolation is padded between the first feature map and the second feature map, and the first feature map and the second feature map are directly spliced to obtain a spliced feature map, in an output feature map obtained by performing a convolutional operation on the spliced feature map when the spliced feature map passes through a convolutional layer, a receptive field corresponding to one element may include elements of the two feature maps. For example, as shown in FIG. 8, the spliced feature map obtained by directly splicing the first feature map and the second feature map is input to the first convolutional layer, and the output feature map obtained after convolution is performed on the spliced feature map is shown in FIG. 8. A receptive field of any one element in the third to sixth columns in the output feature map includes an element of the first feature map and an element of the second feature map, that is, one element in the output feature map includes features of the two images. For example, an area included in a dashed line box in FIG. 8 is a receptive field corresponding to the third element 5 in the first row of the output feature map. The receptive field includes elements of the first feature map and the second feature map, that is, the element 5 includes features of the two images. This affects subsequent detection, recognition, and tracking of an object in the images.

In this embodiment of the present disclosure, by padding elements used to isolate two feature maps between the two feature maps, a result obtained after a spliced feature map passes through a convolutional layer of the convolutional neural network includes a result obtained when each feature map is separately processed. This avoids the following problem: after two feature maps are directly spliced for convolutional processing, receptive fields corresponding to some elements in the output feature map include elements of the two feature maps, and consequently final detection and recognition results of the convolutional neural network are inaccurate.

Because the convolutional neural network includes a plurality of convolutional layers and a plurality of pooling layers, after the third feature map obtained by splicing is input to the first convolutional layer for convolutional processing to obtain the fourth feature map, the fourth feature map is further input to a next network layer (a convolutional layer or a pooling layer) of the convolutional neural network for convolutional processing or pooling processing. The fourth feature map includes one or more columns of interference elements used to isolate the fifth feature map from the sixth feature map, and values of the interference elements are not all 0s. Therefore, before the fourth feature map is input to the next network layer of the convolutional neural network, a column quantity c2 of the interference elements needs to be determined, and the interference elements of the c2 columns need to be deleted from the fourth feature map. Then, a column quantity c3 of ninth data that needs be padded between the last column of the fifth feature map and the first column of the sixth feature map is calculated based on convolutional parameters or pooling parameters of the next network layer with reference to the foregoing (formula 1) to (formula 3). In addition, the ninth data is padded between the last column of the fifth feature map and the first column of the sixth feature map to obtain tenth data (that is, a seventh feature map), and finally the seventh feature map is input to a next network layer.

The intelligent processing apparatus determines, based on the column quantity of the third feature map and the convolutional parameters of the first convolutional layer, a column quantity wo2 of the fourth feature map output by the first convolutional layer, and then determines, based on the column quantities of the output feature maps output after the first feature map and the second feature map are separately input to the first convolutional layer for convolutional operations, a column quantity c2 of elements used for isolation in the fourth feature map. Specifically, the intelligent processing apparatus determines the column quantity wo2 of the fourth feature map according to (formula 4):

$$w_{o2} = \text{ceil}\left(\frac{w_1 + w_2 + 2p_1 + c_1 - k_1 - (k_1 - 1)(d_1 - 1) + 1}{s_1}\right) \quad \text{(Formula 4)}$$

Herein, w2 is the column quantity of the second feature map. After the column quantity of the fourth feature map is obtained, the column quantity c2 of the interference elements in the fourth feature map is determined according to (formula 5):

$$c_2 = w_{o2} - w_{o1} - w_{o3} \quad \text{(Formula 5)}$$

Herein, $w_{o1}$ is the column quantity of the output feature map output after the first feature map is separately input to the first convolutional layer for the convolutional operation, and $w_{o3}$ is the column quantity of the output feature map output after the second feature map is separately input to the first convolutional layer for the convolutional operation.

After the column quantity $c_2$ of the interference elements is determined, the elements of $c_2$ columns are deleted starting from the $(w_{o1}+1)^{th}$ column of the third feature map. Then, according to the same method in S502, the column quantity $c_3$ of the ninth data to be padded between the last column of the fifth feature map and the first column of the sixth feature map is calculated, and the ninth data of $c_3$ columns is padded between the last column of the fifth feature map and the first column of the sixth feature map to obtain a spliced feature map. In addition, elements of $p_2$ rows are padded on each of an upper side and a lower side of the spliced feature map, elements of $p_2$ columns are padded on each of a left side and a right side of the spliced feature map to obtain the tenth data (that is, the seventh feature map), and the seventh feature map is input to a next network layer of the convolutional neural network. Herein, $p_2$ is a padding size corresponding to the next network layer of the convolutional neural network.

Figure 9:
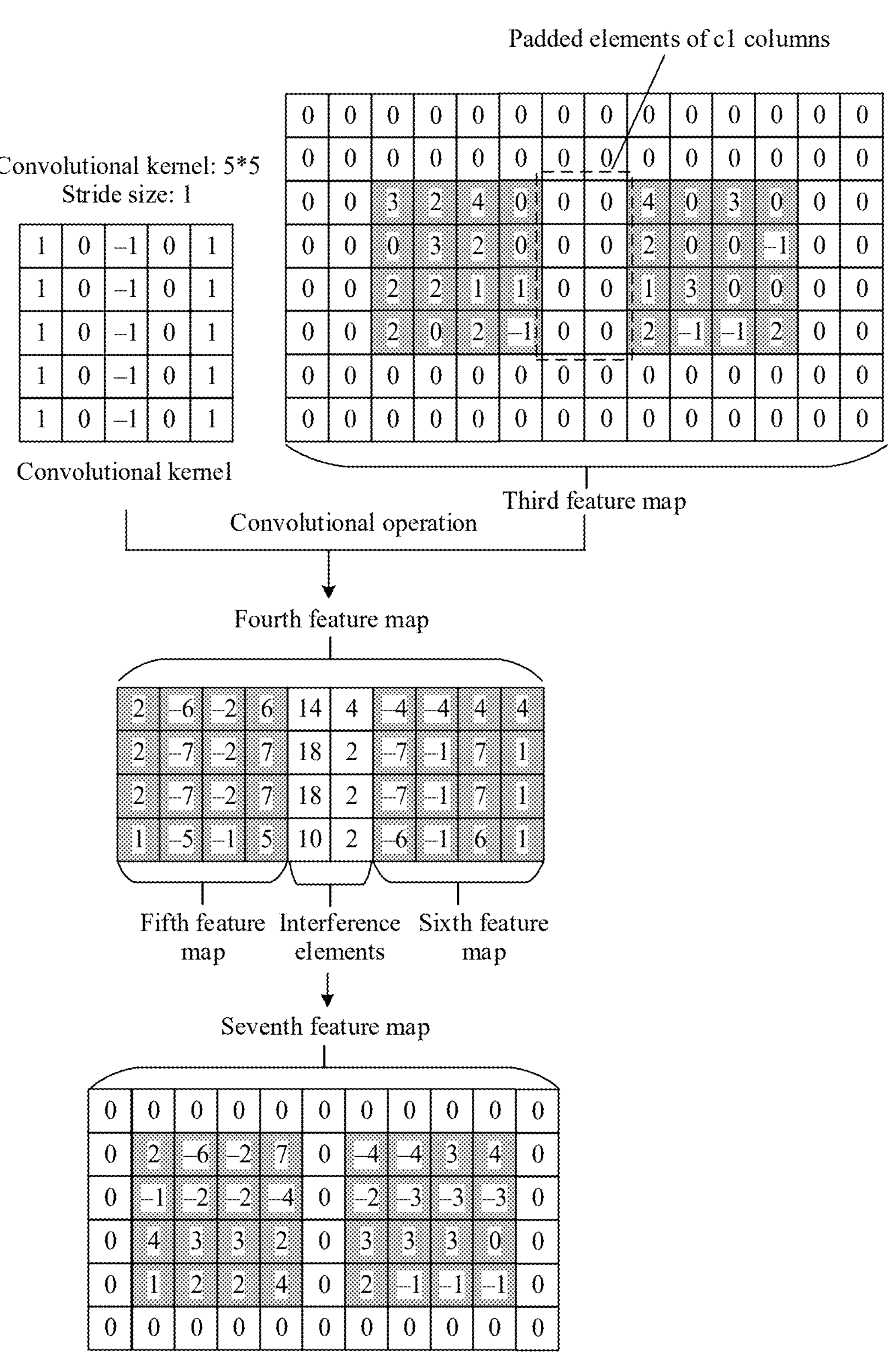
FIG. 9 is a schematic diagram of still another operation on a spliced feature map according to an embodiment of the present disclosure.

For example, as shown in FIG. 9, after the third feature map passes through the first convolutional layer to obtain the fourth feature map, the intelligent processing apparatus can learn, through calculation according to (formula 4), that a value of the column quantity $w_{o2}$ of the fourth feature map is 10, and learn, through calculation according to (formula 5), that a value of the column quantity $c_2$ of the elements used for isolation in the fourth feature map is 2. Then, the intelligent processing apparatus deletes elements of the fifth and sixth columns from the fourth feature map. If the next network layer is a second convolutional layer, a value of a convolutional kernel size k2 is 3, a padding size p2 is 1, a value of a stride size s is 1, and a value of a dilation rate d is 1 for the second convolutional layer. The intelligent processing apparatus can determine, according to the foregoing (formula 1) to (formula 3), that a value of the column quantity $c_3$ of the elements that need be padded between the fifth feature map and the sixth feature map is 1. Then, the intelligent processing apparatus pads the ninth data with one row of elements whose values are 0s between the last column of the fifth feature map and the first column of the sixth feature map to obtain the spliced feature map, pads elements of one row on each of the upper side and the lower side of the spliced feature map to obtain the tenth data (that is, the seventh feature map), and input the seventh feature map to the next network layer of the convolutional neural network.

In a possible implementation, after the value of the column quantity $c_2$ of the interference elements and the value of the column quantity $c_3$ of the elements to be padded between the fifth feature map and the sixth feature map are determined, a column quantity of elements that need to be added or deleted between the fifth feature map and the sixth feature map may be determined based on the value of $c_2$ and the value of $c_3$.

If the value of $c_2$ is the same as the value of $c_3$, all values of the interference elements are replaced with 0s. Then, elements of $p_2$ columns are padded on each of a left side and a right side of the fourth feature map, and elements of $p_2$ rows are padded on each of an upper side and a lower side of the fourth feature map, to obtain the seventh feature map, and the seventh feature map is input to the next network layer of the convolutional neural network. Herein, $p_2$ is a padding size corresponding to the next network layer of the convolutional neural network. If the value of $c_3$ is less than the value of $c_2$, elements of $(c_2-c_3)$ columns in the interference elements are deleted starting from the $(w_{o1}+1)^{th}$ column of the fourth feature map, elements of $c_3$ columns in the interference elements are retained, and values of the retained elements of $c_3$ columns are replaced with 0s. Then, elements of $p_2$ columns are padded on each of a left side and a right side of the fourth feature map, and elements of $p_2$ rows are padded on each of an upper side and a lower side of the fourth feature map, to obtain the seventh feature map, and then the seventh feature map is input to the next network layer of the convolutional neural network. If the value of $c_3$ is greater than the value of $c_2$, elements of $(c_2-c_3)$ columns whose values are 0s are added between the fifth feature map and the sixth feature map, and values of interference elements of $c_2$ columns are replaced with 0s. Then, elements of $p_2$ columns are padded on each of a left side and a right side of the fourth feature map, and elements of $p_2$ rows are padded on each of an upper side and a lower side of the fourth feature map, to obtain the seventh feature map, and then the seventh feature map is input to the next network layer of the convolutional neural network.

The foregoing describes how to determine the column quantity of the third data using the example in which the first feature map and the second feature map are horizontally spliced, and in the third feature map, the first feature map is located on the left side of the second feature map. If in the third feature map, the second feature map is located on the left side of the first feature map, when the column quantity $c_1$ of the third data is calculated, the column quantity in the foregoing (formula 1) and (formula 2) is replaced with the column quantity $w_2$ of the second feature map, that is, in the (formula 1) and (formula 2), a column quantity of a feature map processed first by the convolutional kernel is used for calculation.

It should be understood that, during splicing on the first feature map and the second feature map, the first feature map and the second feature map can be further vertically spliced. When the first feature map and the second feature map are vertically spliced, the intelligent processing apparatus replaces the column quantity in the foregoing formula with a row quantity of a corresponding feature map during calculation performed according to the foregoing formula. When the first feature map and the second feature map are vertically spliced, the intelligent processing apparatus first determines a row quantity $r_1$ of third data based on a row quantity $h_1$ of the first feature map and network parameters of a first network layer; and then, pads the third data of $r_1$ rows and $c_1$ columns whose element values are 0s between the last row of the first feature map and the first row of the second feature map to obtain a spliced feature map. Then, the intelligent processing apparatus pads elements of $p_1$ columns on each of a left side and a right side of the spliced feature map, and pads elements of $p_1$ rows on each of an upper side and a lower side of the spliced feature map, to obtain a third feature map. The third feature map includes elements of $h_1+r_1+h_2+2p_1$ rows and $w_1+2p_1$ columns.

When the row quantity $r_1$ of the third data is determined, the intelligent processing apparatus first determines, based on the row quantity $h_1$ of the first feature map and a convolutional kernel size $k_1$, a padding size $p_1$, and a stride size $s_1$ that correspond to the first convolutional layer, a row quantity $h_{o1}$ of fifth data output after the first feature map is input to a first convolutional layer; based on the row quantity $w_1$, the padding size $p_1$, the stride size $s_1$, and the row quantity $h_{o1}$ of the fifth data, determines a distance $\Delta h$ between a center of the last operation on the first feature map and a center of the first operation on the second feature map in a vertical direction when a convolutional kernel of the first convolutional layer processes spliced data after the spliced data is obtained by padding data of $h_1$ rows and $p_1$ columns between the last row of the first feature map and the first row of the second feature map; and determines the row quantity $r_1$ of the third data based on the padding size p1, the stride size s1, and the distance $\Delta h$. That is, a method for calculating a row quantity of elements to be padded between the first feature map and the second feature map when the first feature map and the second feature map are vertically spliced is the same as a method for calculating a column quantity of elements to be padded between the first feature map and the second feature map when the first feature map and the second feature map are horizontally spliced, and only the column quantity of the first feature map in the foregoing (formula 1) to (formula 3) needs to be replaced with the row quantity of the first feature map. For example, when the row quantity $h_{o1}$ of the output feature map output after the first feature map is separately input to the first convolutional layer for a convolutional operation is determined according to (formula 1), the column quantity $w_1$ of the first feature map is replaced with the row quantity $h_1$ of the first feature map.

After obtaining the third feature map, the intelligent processing apparatus inputs the third feature map to the first convolutional layer to perform convolutional processing to obtain sixth data (that is, a fourth feature map). The fourth feature map includes seventh data (that is, a fifth feature map), eighth data (that is, a sixth feature map), and interference data. The fifth feature map is a feature map obtained after the first feature map is separately input to the first convolutional layer for convolutional processing. The sixth feature map is a feature map obtained after the second feature map is separately input to the first convolutional layer for convolutional processing. That is, the fifth feature map is a feature extracted from the first feature map, and the sixth feature map is a feature extracted from the second feature map. The interference data is elements between the last row of the fifth feature map and the first row of the sixth feature map.

Before the fourth feature map is input to a next network layer, the intelligent processing apparatus determines a row quantity $h_{o2}$ of the fourth feature map based on the row quantity $h_1+r_1+h_2+2p_1$ of the third feature map and the network parameters of the first network layer; determines a row quantity $r_2$ of the interference data based on the row quantity $h_{o2}$ of the fourth feature map, a row quantity of the fifth feature map, and a row quantity of the sixth feature map, and deletes the interference data of $r_2$ rows; determines a row quantity $r_3$ of ninth data to be padded between the last row of the fifth feature map and the first row of the sixth feature map, and pads the ninth data of $r_3$ columns between the last row of the fifth feature map and the first row of the sixth feature map, to obtain tenth data (that is, a seventh feature map); and finally inputs the seventh feature map to a next network layer.

It should be understood that, a method for calculating the row quantity of the interference elements between the fifth feature map and the sixth feature map when the first feature map and the second feature map are vertically spliced is the same as a method for calculating the column quantity of the interference elements when the first feature map and the second feature map are horizontally spliced, and only a column quantity of each feature map in the foregoing (formula 4) and (formula 5) needs to be replaced with a row quantity of the corresponding feature map. For example, when the row quantity $h_{o2}$ of the fourth feature map output after the third feature map is input to the first convolutional layer for a convolutional operation is determined according to (formula 4), the column quantity $w_1$ of the first feature map is replaced with the row quantity $h_1$ of the first feature map, the column quantity $w_2$ of the second feature map is replaced with the row quantity $h_2$ of the second feature map, and the column quantity $c_1$ is replaced with $r_1$.

It should be understood that, when the first feature map is a pixel matrix corresponding to the first image, and the second feature map is a pixel matrix corresponding to the second image, that is, when the first feature map and the second feature map are input to the first convolutional layer, it is only necessary to determine a column quantity or a row quantity of elements to be padded between the first feature map and the second feature map.

In this embodiment of the present disclosure, when the row quantities of the first feature map and the second feature map are the same, and the column quantities of the first feature map and the second feature map are also the same, a fully connected layer may be replaced with a convolutional layer. A convolutional kernel size of the convolutional layer used to replace the fully connected layer is a size of a single feature map, a stride size of a convolutional kernel in a horizontal direction is equal to a column quantity of a single feature map, and a stride size of the convolutional kernel in a vertical direction is equal to a row quantity of a single feature map. Therefore, when a feature map output by a convolutional layer or a pooling layer needs to be input to a fully connected layer, only interference elements of a feature map output by the last convolutional layer or the last pooling layer need to be determined, and after the interference elements are deleted, different feature maps are directly spliced and input to a fully connected layer, with no need to pad elements used for isolation between the different feature maps. For example, when the fourth feature map is a feature map output by the last convolutional layer, only a column quantity $c_2$ of the interference elements between the fifth feature map and the sixth feature map needs to be determined, and the interference elements of $c_2$ columns are deleted from the fourth feature map. Then, the fifth feature map and the sixth feature map are directly spliced to obtain a seventh feature map, and the seventh feature map may be input to a fully connected layer.

The foregoing uses an example in which the first feature map and the second feature map are input to a convolutional layer to describe how to determine the column quantity of elements to be padded between the first feature map and the second feature map, and how to splice the first feature map and the second feature map, and describe how to determine the column quantity of elements to be added or deleted between the fifth feature map and the sixth feature map after the fourth feature map is obtained and before the fourth feature map is input to a next convolutional layer or pooling layer. If the first feature map and the second feature map are input to a pooling layer, the intelligent processing apparatus needs to obtain pooling parameters of the pooling layer to which the first feature map and the second feature map are to be input, and replaces the convolutional parameters in (formula 1) to (formula 5) with the pooling parameters for calculation. For example, a convolutional kernel size is replaced with a pooling kernel size of the pooling layer, a padding size of a convolutional layer is replaced with a padding size of the pooling layer, a stride size of a convolutional kernel of the convolutional layer is replaced with a stride size of a pooling kernel of the pooling layer, and the like. When the pooling parameters are used for calculation, a value of a dilation rate d in the foregoing (formula 1) is 1.

The foregoing embodiment uses an example in which two feature maps are spliced to describe the data processing method provided in this embodiment of the present disclosure. It should be understood that the splicing method for feature maps may be further applied to splicing of more than two feature maps. When a quantity of feature maps that need to be spliced is greater than or equal to 3, two feature maps may be spliced to obtain a new feature map according to the splicing method for two feature maps, and then the new feature map and the other feature map are spliced according to the splicing method for two feature maps, until all feature maps are spliced into one feature map. When a quantity of feature maps that need to be spliced is an even number greater than 2, half of the feature maps may be horizontally spliced according to the splicing method for feature maps whose quantity is greater than or equal to 3, to obtain a new feature map. Then, the other half of the feature maps are horizontally spliced according to the same method to obtain another new feature map. Subsequently, the two new feature maps are vertically spliced to obtain a final feature map.

In the foregoing embodiment, an example in which both the first data and the second data are image data is used to describe the data processing method provided in this embodiment of the present disclosure. It should be understood that the foregoing method may be further applied to processing of voice data or text sequences. For example, when the first data and the second data each are a segment of voice data, after receiving the first data and the second data, the intelligent processing apparatus first separately converts the voice data into a text sequence, then converts each word in the text sequence into a word vector using a word embedding algorithm, and forms one matrix using the word vector corresponding to each word in the segment of voice data according to a preset rule. The matrix is in a same form as the first feature map. Therefore, the intelligent processing apparatus may convert the two segments of voice data into matrices, then splice the matrices corresponding to the segments of voice data according to a method same as the foregoing method for feature maps, and input to a spliced matrix to the convolutional neural network for processing.

It should be noted that, the foregoing data processing method may be further applied to processing of different types of data. The first data may be any one of image data, voice data, or a text sequence, and the second data may be any one of image data, voice data, or a text sequence. This is not specifically limited in embodiments of the present disclosure.

It should be noted that, for brief description, the foregoing method embodiment is described as a series of action combinations. However, a person skilled in the art should understand that the present disclosure is not limited by the described action sequence. In addition, a person skilled in the art should also understand that related actions are unnecessarily mandatory for the present disclosure.

Other appropriate step combinations that can be figured out by a person skilled in the art based on the content described above also fall within the protection scope of the present disclosure. In addition, a person skilled in the art should also understand that all embodiments described in this specification are preferred embodiments, and the related actions are not necessarily mandatory to the present disclosure.

The foregoing describes in detail the data processing method provided in embodiments of the present disclosure with reference to FIG. 1 to FIG. 9. The following describes a data processing apparatus and a computing device provided in embodiments of the present disclosure with reference to FIG. 10 and FIG. 12.

Figures 10, 11:
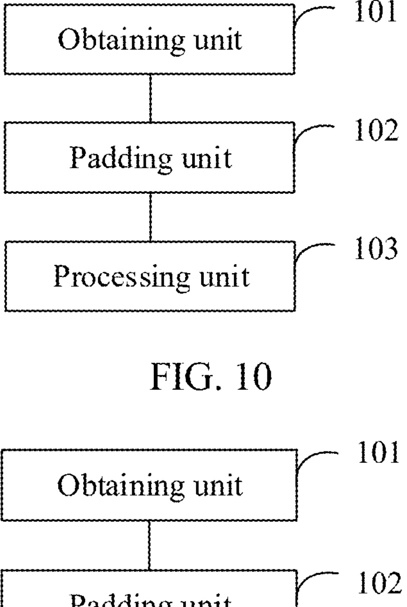
FIG. 10 is a schematic diagram of a data processing apparatus according to an embodiment of the present disclosure.
FIG. 11 is a schematic diagram of another data processing apparatus according to an embodiment of the present disclosure.

FIG. 10 is a schematic diagram of a data processing apparatus according to an embodiment of the present disclosure. The data processing apparatus is used in the intelligent processing apparatus shown in FIG. 2 or FIG. 3, and the data processing apparatus 100 includes an obtaining unit 101, a padding unit 102, and a processing unit 103.

The obtaining unit 101 is configured to obtain first data and second data, where the first data is any one of image data, voice data, or a text sequence, and the second data is any one of image data, voice data, or a text sequence. The first data and the second data are data that needs to be spliced in adjacent sequences. During splicing, a sequence of the first data is prior to a sequence of the second data. In other words, in a sequence obtained after splicing is completed, the first data is processed before the second data.

The padding unit 102 is configured to pad third data between the first data and the second data to obtain fourth data, where the third data isolates the first data from the second data.

The processing unit 103 is configured to complete data processing on the fourth data using a convolutional neural network. Because the convolutional neural network includes a plurality of convolutional layers and a plurality of pooling layers, processing the fourth data using the convolutional neural network means that the fourth data is input to a first network layer for processing. The first network layer may be a convolutional layer or may be a pooling layer.

It should be understood that the data processing apparatus 100 in this embodiment of the present disclosure may be implemented using an application-specific integrated circuit (ASIC) or a programmable logic device (PLD). The PLD may be a complex programmable logic device (CPLD), a field-programmable gate array (FPGA), a general array logic (GAL), or any combination thereof. Alternatively, when the data processing method shown in FIG. 1 to FIG. 9 is implemented using software, the data processing apparatus 100 and modules thereof may be software modules.

It should be understood that, when the third data is padded between the first data and the second data to splice the first data and the second data into the fourth data, the first data and the second data may be horizontally or vertically spliced. For a manner of splicing between the first data and the second data and a method for determining a row quantity and column quantity of the third data during splicing, refer to specific descriptions in the method embodiment corresponding to FIG. 5. Details are not described herein again.

In a possible implementation, as shown in FIG. 11, the data processing apparatus 100 further includes a deletion unit 104. That the processing unit 103 completes data processing on the fourth data using a convolutional neural network specifically includes: inputting the fourth data to the first network layer for processing to obtain sixth data, where the sixth data includes seventh data, eighth data, and interference data, the seventh data is obtained after the first network layer processes the first data, the eighth data is obtained after the first network layer processes the second data, and the interference data is data between the seventh data and the eighth data.

The deletion unit 104 is configured to determine a column quantity or a row quantity of the interference data, and delete the interference data. For a method for determining the column quantity or the row quantity of the interference data by the deletion unit 104, refer to the method for determining the interference column quantity $c_2$ and the interference row quantity $h_2$ by the intelligent processing apparatus in the foregoing method embodiment. Details are not described herein again.

The padding unit 102 is further configured to: after the interference data is deleted, determine a column quantity or a row quantity of ninth data to be padded between the seventh data and the eighth data, and pad the ninth data between the seventh data and the eighth data to obtain tenth data.

The processing unit 103 is further configured to complete data processing on the tenth data using the convolutional neural network.

Specifically, for a data processing operation implemented by the foregoing data processing apparatus 100, refer to related operations of the intelligent processing apparatus in the foregoing method embodiment. Details are not described herein again.

Figure 12:
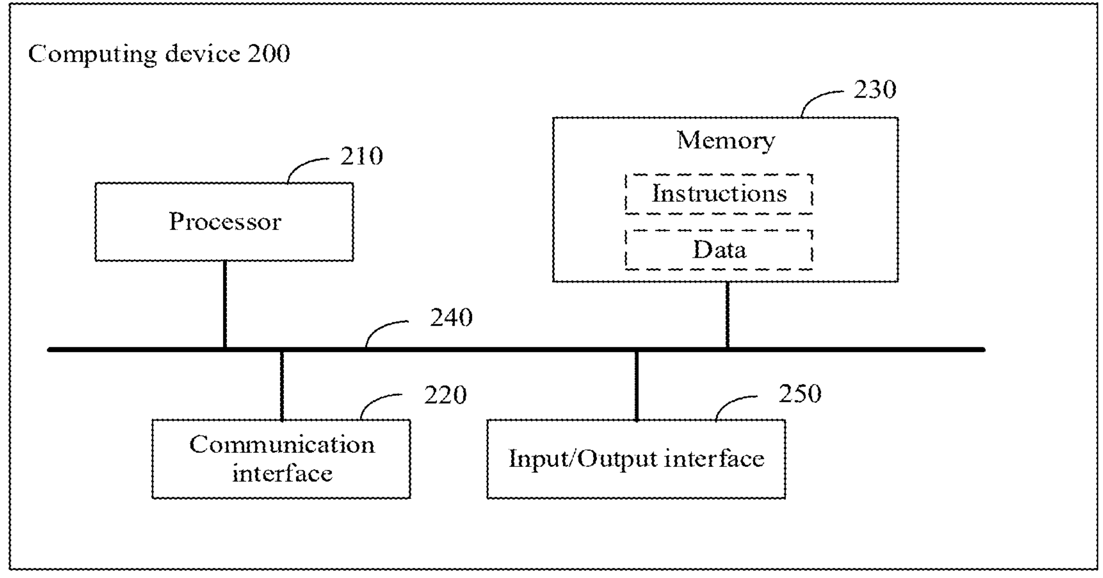
FIG. 12 is a schematic diagram of a computing device according to an embodiment of the present disclosure.

FIG. 12 is a schematic diagram of a structure of a computing device according to an embodiment of the present disclosure. The computing device 200 includes a processor 210, a communication interface 220, and a memory 230. The processor 210, the communication interface 220, and the memory 230 are connected to each other through a bus 240. The processor 210 is configured to execute instructions stored in the memory 230. The memory 230 stores program code, and the processor 210 may invoke the program code stored in the memory 230 to perform the following operations:

The computing device 200 obtains first data and second data, pads, according to a preset rule, third data used to isolate the first data from the second data between the first data and the second data, to obtain fourth data, and then completes processing on the fourth data using a convolutional neural network. The first data and the second data are data to be spliced together, and a sequence of the first data is prior to a sequence of the second data during splicing. The first data is any one of image data, voice data, or a text sequence, and the second data is any one of image data, voice data, or a text sequence.

In this embodiment of the present disclosure, the processor 210 may have a plurality of specific implementation forms. For example, the processor 210 may be any one or a combination of a plurality of processors such as a CPU, a GPU, a TPU, or an NPU, or the processor 210 may be a single-core processor or a multi-core processor. The processor 210 may include a combination of a CPU (GPU, TPU, or NPU) and a hardware chip. The hardware chip may be an ASIC, a PLD, or a combination thereof. The PLD may be a CPLD, a FPGA, a GAL, or any combination thereof. Alternatively, the processor 210 may be implemented independently using a logic device with embedded processing logic, for example, an FPGA or a digital signal processor (DSP).

Figure 2:
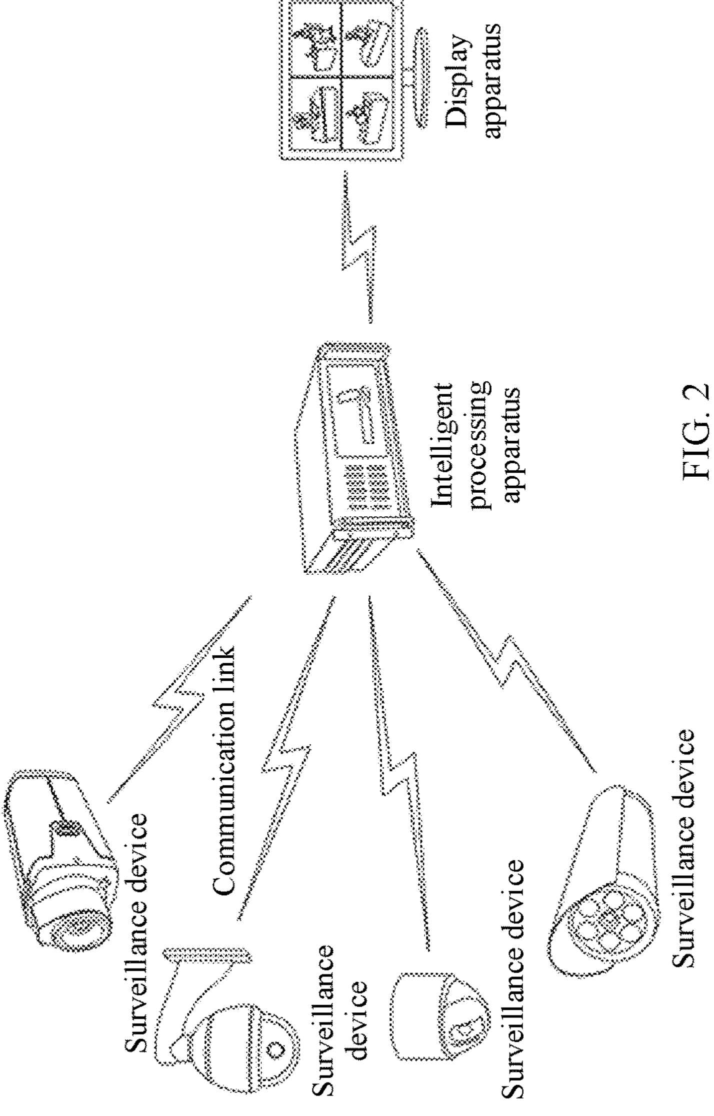
FIG. 2 is a schematic diagram of a system architecture according to an embodiment of the present disclosure.
Figure 3:
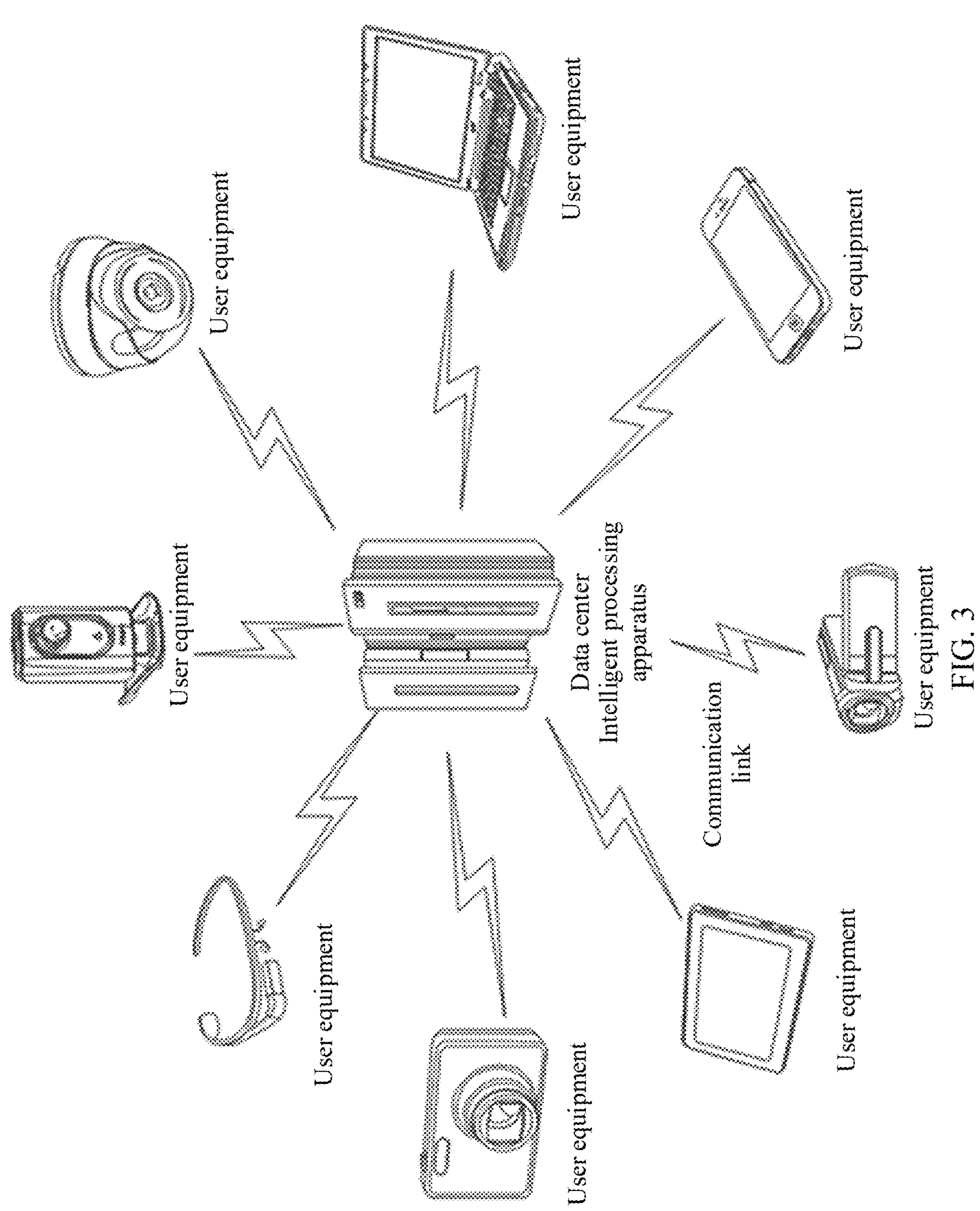
FIG. 3 is a schematic diagram of another system architecture according to an embodiment of the present disclosure.

The communication interface 220 may be a wired interface or a wireless interface, and is configured to communicate with another module or device, for example, receive a video or an image sent by a surveillance device in FIG. 2, or receive a video or an image sent by user equipment in FIG. 3. The wired interface may be an Ethernet interface, a Controller Area Network (CAN) interface, or a local interconnect network (LIN) interface, and the wireless interface may be a cellular network interface, a wireless local area network interface, or the like.

The memory 230 may be a non-volatile memory, for example, a read-only memory (ROM), a programmable read-only memory (PROM), an erasable programmable read-only memory (EPROM), an electrically erasable programmable read-only memory (EEPROM), or a flash memory. The memory 230 may alternatively be a volatile memory, which may be a random access memory (RAM) that serves as an external cache.

The memory 230 may alternatively be configured to store instructions and data, so that the processor 210 invokes the instructions stored in the memory 230 to implement an operation performed by the processing unit 103 or an operation performed by the intelligent processing apparatus in the method embodiment. Further, the computing device 200 may include more or fewer components than those shown in FIG. 12, or may have different component configurations.

The bus 240 may be classified into an address bus, a data bus, a control bus, and the like. For ease of representation, only one thick line is used for representation in FIG. 12, but this does not mean that there is only one bus or only one type of bus.

Optionally, the computing device 200 may further include an input/output interface 250. The input/output interface 250 is connected to an input/output device, and is configured to receive input information and output an operation result.

It should be understood that the computing device 200 in this embodiment of the present disclosure may correspond to the data processing apparatus 100 in the foregoing embodiment, and may perform operations performed by the intelligent processing apparatus in the foregoing method embodiment. Details are not described herein again.

An embodiment of the present disclosure further provides a non-transient computer storage medium. The computer storage medium stores instructions, and when the instructions are run on a processor, the method steps in the foregoing method embodiment may be implemented. For specific implementation of performing the foregoing method steps by the processor of the computer storage medium, refer to specific operations of the foregoing method embodiment. Details are not described herein again.

In the foregoing embodiments, the description of each embodiment has respective focuses. For a part that is not described in detail in an embodiment, refer to related descriptions in other embodiments.

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on the computer, the procedures or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or magnetic tape), an optical medium, or a semiconductor medium, and the semiconductor medium may be a solid state disk.

The foregoing descriptions are merely specific implementations of the present disclosure. Based on the specific implementations provided in the present disclosure, a person skilled in the art can figure out variations or replacements, which shall all fall within the protection scope of the present disclosure.

What is claimed is:

1. A method implemented by a computing device, the method comprising:

obtaining, by one or more processors of the computing device, first data and second data, wherein the first data and the second data are adjacent sequence data, and wherein a first sequence of the first data is prior to a second sequence of the second data;

calculating, by the one or more processors, a quantity of zero-valued elements of third data based on a size k1 of a convolutional kernel or a pooling kernel, a padding size p1, and a stride size s1 of a network layer of a convolutional neural network, wherein no output element of the network layer has a receptive field spanning both the first data and the second data;

generating, by the one or more processors, fourth data comprising the first data, the second data, the third data, wherein the fourth data is generated by padding the third data between the first data and the second data according to a preset rule, and wherein the third data isolates the first data from the second data; and completing, by the one or more processors, data processing on the fourth data using the convolutional neural network by inputting the fourth data into the network layer in a single forward inference pass for processing to obtain sixth data, wherein the sixth data comprises seventh data, eighth data, and interference data, wherein the seventh data is obtained after the network layer processes the first data and corresponds to only the first data, wherein the eighth data is obtained after the network layer processes the second data and corresponds to only the second data, wherein the interference data is ninth data between a last row of the seventh data and a first row of the eighth data, and wherein the single forward inference pass utilizes a bandwidth and a computing capability of the computing device without separately performing vectorization or fractal operations on each of the first data and the second data.

2. The method of claim 1, wherein the first data and the second data are image data, voice data, or a text sequence.

3. The method of claim 2, wherein padding the third data between the first data and the second data according to the preset rule comprises padding the third data of h1 rows and c1 columns between a last column of the first data and a first column of the second data to obtain the fourth data, wherein the first data comprises h1 rows and w1 columns, the second data comprises h2 rows and w2 columns, and the fourth data comprises h1+2p1 rows and w1+c1+w2+2p1 columns, wherein values of h1 and h2 are the same, and wherein p1 is the padding size p1 corresponding to the network layer.

4. The method of claim 2, wherein padding the third data between the first data and the second data according to the preset rule comprises padding the third data of r1 rows and w1 columns between a last row of the first data and a first row of the second data to obtain the fourth data, wherein the first data comprises h1 rows and w1 columns, the second data comprises h2 rows and w2 columns, and the fourth data comprises h1+r1+h2+2p1 rows and w1+2p1 columns, wherein values of w1 and w2 are the same, and wherein p1 is the padding size p1 corresponding to the network layer.

5. The method of claim 3, wherein padding the third data of h1 rows and c1 columns between the last column of the first data and the first column of the second data to obtain the fourth data comprises:

determining a first column quantity cl of the third data based on a second column quantity w1 of the first data and network parameters of the network layer, wherein the network parameters comprise a size k1 of the convolutional kernel or the pooling kernel, the padding size p1, and the stride size s1;

obtaining a row quantity h1 of the third data; and padding the third data of h1 rows and c1 columns between the last column of the first data and the first column of the second data to obtain the fourth data.

6. The method of claim 5, wherein determining the first column quantity c1 of the third data based on the second column quantity w1 of the first data and the network parameters of the network layer comprises:

determining, based on the second column quantity w1 of the first data, the size k1, the padding size p1, and the stride size s1, a third column quantity wol of fifth data output after the first data is input to the network layer;

determining, based on the second column quantity w1, the padding size p1, the stride size s1, and the third column quantity wo1, a distance Aw between a first center of a last operation on the first data and a second center of a first operation on the second data in a horizontal direction when the convolutional kernel or the pooling kernel processes spliced data after the spliced data is obtained by padding tenth data of h1 rows and p1 columns between the last column of the first data and the first column of the second data; and determining the first column quantity c1 based on the padding size p1, the stride size s1, and the distance Δw.

7. The method of claim 4, wherein padding the third data of r1 rows and w1 columns between the last row of the first data and the first row of the second data to obtain the fourth data comprises:

determining a first row quantity r1 of the third data based on a second row quantity h1 of the first data and network parameters of the network layer, wherein the network parameters comprise a size k1 of the convolutional kernel or the pooling kernel, the padding size p1, and the stride size s1;

obtaining a column quantity w1 of the first data; and padding the third data of r1 rows and w1 columns between the last row of the first data and the first row of the second data to obtain the fourth data.

8. The method of claim 7, wherein determining the first row quantity r1 of the third data based on the second row quantity h1 of the first data and the network parameters of the network layer comprises:

determining, based on the second row quantity h1 of the first data, the size k1, the padding size p1, and the stride size s1, a third row quantity hol of fifth data output after the first data is input to the network layer;

determining, based on the second row quantity h1, the padding size p1, the stride size s1, and the third row quantity ho1, a distance Δh between a first center of a last operation on the first data and a second center of a first operation on the second data in a vertical direction when the convolutional kernel or the pooling kernel processes spliced data after the spliced data is obtained by padding tenth data of h1 rows and p1 columns between the last row of the first data and the first row of the second data; and determining the first row quantity r1 based on the padding size p1, the stride size s1, and the distance Δh.

9. The method of claim 7, wherein completing the data processing on the fourth data using the convolutional neural network further comprises:

determining a third row quantity r2 of the interference data;

deleting the interference data of r2 rows;

determining a fourth row quantity r3 of tenth data padded between the last row of the seventh data and the first row of the eighth data;

padding the tenth data of r3 rows between the last row of the seventh data and the first row of the eighth data to obtain eleventh data; and completing data processing on the eleventh data using the convolutional neural network.

10. A computing device comprising:

a memory configured to store instructions; and one or more processors coupled to the memory and configured to execute the instructions to cause the computing device to:

obtain first data and second data, wherein the first data and the second data are adjacent sequence data, and a first sequence of the first data is prior to a second sequence of the second data;

calculate a quantity of zero-valued elements of third data based on a size k1 of a convolutional kernel or a pooling kernel, a padding size p1, and a stride size s1 of a network layer of a convolutional neural network, wherein no output element of the network layer has a receptive field spanning both the first data and the second data;

generate fourth data comprising the first data, the second data, the third data, wherein the fourth data is generated by padding the third data between the first data and the second data according to a preset rule, and wherein the third data isolates the first data from the second data; and complete data processing on the fourth data using the convolutional neural network by inputting the fourth data into the network layer in a single forward inference pass for processing to obtain sixth data, wherein the sixth data comprises seventh data, eighth data, and interference data, wherein the seventh data is obtained after the network layer processes the first data and corresponds to only the first data, wherein the eighth data is obtained after the network layer processes the second data and corresponds to only the second data, wherein the interference data is ninth data between a last row of the seventh data and a first row of the eighth data, and wherein the single forward inference pass utilizes a bandwidth and a computing capability of the computing device without separately performing vectorization or fractal operations on each of the first data and the second data.

11. A computer program product comprising computer-executable instructions stored on a non-transitory computer-readable storage medium, the computer-executable instructions when executed by one or more processors of a computing device, cause the computing device to:

obtain first data and second data, wherein the first data and the second data are adjacent sequence data, and a first sequence of the first data is prior to a second sequence of the second data;

calculate a quantity of zero-valued elements of third data based on a size k1 of a convolutional kernel or a pooling kernel, a padding size p1, and a stride size s1 of a network layer of a convolutional neural network, wherein no output element of the network layer has a receptive field spanning both the first data and the second data;

generate fourth data comprising the first data, the second data, the third data, wherein the fourth data is generated by padding the third data between the first data and the second data according to a preset rule, and wherein the third data isolates the first data from the second data; and complete data processing on the fourth data using the convolutional neural network by inputting the fourth data into the network layer in a single forward inference pass for processing to obtain sixth data, wherein the sixth data comprises seventh data, eighth data, and interference data, wherein the seventh data is obtained after the network layer processes the first data and corresponds to only the first data, wherein the eighth data is obtained after the network layer processes the second data and corresponds to only the second data, wherein the interference data is ninth data between a last row of the seventh data and a first row of the eighth data, and wherein the single forward inference pass utilizes a bandwidth and a computing capability of the computing device without separately performing vectorization or fractal operations on each of the first data and the second data.

12. The computer program product of claim 11, wherein the first data and the second data are image data, voice data, or a text sequence.

13. The method of claim 1, wherein the one or more processors comprise a neural network processing unit (NPU) configured to execute the convolutional neural network.

14. The method of claim 1, wherein obtaining the first data and the second data comprises receiving, by the one or more processors via a communication interface of the computing device, the first data and the second data from a surveillance device.

15. The method of claim 1, wherein calculating the quantity of zero-valued elements of the third data is further based on a dilation rate dl of the convolutional kernel or the pooling kernel of the network layer.

16. The method of claim 1, further comprising obtaining, by the one or more processors, third-sequence data, wherein the fourth data further comprises the third-sequence data and additional zero-valued isolation elements padding between the second data and the third-sequence data, wherein no output element of the network layer has a receptive field spanning the second data and the third-sequence data, and wherein the single forward inference pass simultaneously processes the first data, the second data, and the third-sequence data to produce corresponding output results that are isolated from each other in the sixth data.

17. The method of claim 1, wherein completing the data processing on the fourth data using the convolutional neural network further comprises:

calculating, by the one or more processors, a column quantity wo2 of the sixth data based on a column quantity of the fourth data, the size k1, the padding size p1, and the stride size s1;

calculating, by the one or more processors, a column quantity c2 of the interference data based on the column quantity wo2, a column quantity of the seventh data, and a column quantity of the eighth data;

deleting, by the one or more processors, the interference data of c2 columns from the sixth data;

padding, by the one or more processors, twelfth data comprising zero-valued elements of a quantity c3 of columns between a last column of the seventh data and a first column of the eighth data to obtain tenth data; and completing, by the one or more processors, data processing on the tenth data using the convolutional neural network.

18. The method of claim 17, wherein the quantity c3 of columns of the twelfth data equals the column quantity c2 of the interference data, and wherein padding the twelfth data comprises replacing values of the interference data of c2 columns with zeros in the sixth data to obtain the tenth data without deleting any columns from the sixth data.

19. The method of claim 1, wherein the convolutional neural network comprises a fully connected layer following the network layer, and wherein completing the data processing on the fourth data using the convolutional neural network further comprises:

deleting, by the one or more processors, the interference data from the sixth data; and inputting, by the one or more processors, the seventh data and the eighth data directly to the fully connected layer as a spliced input without padding isolation elements between the seventh data and the eighth data.

20. The method of claim 1, wherein the first data comprises a three-dimensional pixel matrix corresponding to a first color image, wherein the second data comprises a three-dimensional pixel matrix corresponding to a second color image, and wherein the method further comprises inputting, by the one or more processors, a four-dimensional tensor formed by the fourth data to the network layer for the single forward inference pass.

* * * * *